US010345191B2

(12) United States Patent
Walter et al.

(10) Patent No.: US 10,345,191 B2
(45) Date of Patent: Jul. 9, 2019

(54) TRANSPORTABLE WIND TUNNEL (71) Applicants: Joel A. Walter, Waterford, MI (US);
Edward G. Duell, Louisville, CO (US);
Paul A. Nagle, Novi, MI (US)

(72) Inventors: Joel A. Walter, Waterford, MI (US);
Edward G. Duell, Louisville, CO (US);
Paul A. Nagle, Novi, MI (US)

(73) Assignee: JACOBS TECHNOLOGY INC., Tullahoma, TN (US)

(*) Notice: Subject to any disclaimer, the term of this patent is extended or adjusted under 35 U.S.C. 154(b) by 0 days.

(21) Appl. No.: 15/415,687

(22) Filed: Jan. 25, 2017

(65) Prior Publication Data

US 2017/0212005 A1 Jul. 27, 2017

Related U.S. Application Data (60) Provisional application No. 62/286,898, filed on Jan. 25, 2016.

(51) Int. Cl.
*G01M 9/04* (2006.01)
*G01M 9/06* (2006.01)
*G01M 17/007* (2006.01)

(52) U.S. Cl.
CPC .............. *G01M 9/04* (2013.01); *G01M 9/065* (2013.01); *G01M 17/007* (2013.01)

(58) Field of Classification Search
CPC ...... G01M 17/007; G01M 9/04; G01M 9/065; G01M 9/00; G01M 17/00
See application file for complete search history.

(56) References Cited

U.S. PATENT DOCUMENTS

| 3,435,671 | A | 1/1969 | Hildt |
| 5,495,754 | A * | 3/1996 | Starr, Jr. ................ G01M 9/02 73/146 |
| 5,627,311 | A | 5/1997 | Nakaya et al. |
| 7,832,265 | B1 * | 11/2010 | Gong .................... A63B 67/002 73/147 |

(Continued)

FOREIGN PATENT DOCUMENTS

| ES | WO2010/139815 A1 | 12/2010 | |
| GB | 619250 A * | 3/1949 | .............. G01M 9/02 |

(Continued)

OTHER PUBLICATIONS

International Search Report and Written Opinion, PCT/US17/14966, Walter, Joel A. (filed Jan. 25, 2017).

(Continued)

*Primary Examiner* — Francis C Gray
(74) *Attorney, Agent, or Firm* — Wayne Edward Ramage; Baker Donelson (57) ABSTRACT

A transportable wind tunnel testing automobiles, motorcycles, bicycles, scale-model aircraft, building structures, and other products requiring high-quality and low noise directed air flow. The wind tunnel comprises one or more containers which can be separately transported on trailers. Each wind tunnel container comprises one or more fans, conditioning screens, acoustic baffles, and a reduction or contraction section. Wind tunnels may be connected end-to-end or side-to-side, with joined outflow. The wind tunnel containers can be used on the trailers, or can be removed and temporarily installed at a location.

13 Claims, 8 Drawing Sheets

(56) References Cited

U.S. PATENT DOCUMENTS 9,778,135 B1 * 10/2017 Beckman ................. G01M 9/02
2014/0105729 A1 * 4/2014 Tarbox ................... F03D 1/025
                                                                     415/122.1

FOREIGN PATENT DOCUMENTS

GB         619250 A * 3/1949
JP         8313390 A   11/1996

OTHER PUBLICATIONS

Kreindler, Derek, "Yakima Whispbar Debuts With Portable Wind Tunnel," Autoguide.com News, Nov. 10, 2011 <https://www.autoguide.com/auto-news/2011/11/yakima-whispbar-debuts-with-portable-wind-tunnel.html>.

Ford Media Center, "Shhhh! Ford Targets Quieter, Highly Refined Vehicles for Customers with Debut of World's First Mobile Aeroacoustic Wind Tunnel," May 4, 2016 <https://media.ford.com/content/fordmedia/fna/us/en/news/2016/05/04/world-first-mobile-aeroacoustic-wind-tunnel.html>.

Ford Media Center, "World's First Mobile Aeroacoustic Wind Tunnel by Ford," Apr. 16, 2016 <https://www.youtube.com/watch?v=W1J-NcsKDtl&feature=youtu.be>.

* cited by examiner

TRANSPORTABLE WIND TUNNEL

This application claims benefit of and priority to U.S. Provisional Application No. 62/286,898, filed Jan. 25, 2016, by Joel A. Walter, et al., and is entitled to that filing date for priority. The specification, figures, and complete disclosure of U.S. Provisional Application No. 62/286,898 are incorporated herein in their entireties by specific reference for all purposes.

FIELD OF INVENTION

This invention relates to a transportable apparatus for providing a wind tunnel for testing automobiles, motorcycles, bicycles, scale-model aircraft, building structures, and other products requiring high-quality and low noise directed air flow.

BACKGROUND OF INVENTION

Wind tunnels are well known in the prior art for testing various articles, including, but not limited to, aircraft, automobiles, trucks, and other vehicles. Examples of prior art wind tunnels, testing apparatus, and variations thereof used for aerodynamic or aeroacoustic testing are disclosed in Barske, U.S. Pat. No. 4,593,558; Bouis, U.S. Pat. No. 5,452,609; and Knestel, U.S. Pat. No. 9,146,174, all of which are incorporated herein in their entireties by specific reference for all purposes.

Prior art wind tunnels, however, are large, permanent installations that are expensive to build and operate. The article or vehicle being tested must often be inserted into the wind tunnel or testing chamber, to reduce noise, interfering turbulence, and other factors. Further, use of prior wind tunnels can be inconvenient, as the articles or vehicles being tested must often be transported long distances to the location of the wind tunnel.

SUMMARY OF INVENTION

In various exemplary embodiments, the present invention comprises a transportable wind tunnel for use in full-scale aerodynamic or aeroacoustic testing, including, but not limited to, testing of automobiles or other vehicles. The wind tunnel comprises one or more wind tunnel or wind generating containers which may be connected side-by-side or end-to-end to provide a wind tunnel of desired length and power.

Wind generator containers can be used separately or in combination. In one exemplary embodiment, two wind generator containers are placed side-to-side. Each wind generator containers houses several wind tunnel components, including, but not limited to, one or more variable speed axial fans with fan motors, flow conditioning elements, such as flow conditioning or turbulence screens, and acoustic treatment elements, such as acoustic baffles or vane, which may be located both upstream and downstream of the fans. The acoustic treatment elements help reduce or cancel noise from the system, thereby allowing more accurate measurement of noise resulting from airflow over the test article.

One or more separate control containers house electrical equipment and control systems and rooms (e.g., operator console) for support and operation of the wind tunnel.

In several exemplary embodiments, the wind generating containers and control containers are modified shipping containers, and are separately mounted or secured on flat-bed trailers for transport. The containers may thus be transported to different locations. The containers may then be removed from the respective trailers and placed on the ground or otherwise installed at the desired locations. The article being tested, such as, but not limited to, an automobile or truck, can then be placed on the ground outside the outflow exit point for testing. It should be noted that the article being tested need not be in an enclosed area, and the testing area may be in the open air.

Alternatively, the containers may be attached to or integral with and installed on the respective flat-bed trailer chassis. The wind tunnel is then assembled on location by appropriate arrangement (e.g., side-by-side) of the flat-bed trailers with the wind tunnel containers. For example, in one configuration two standard flat-bed trailers, each with a wind generating container, are placed side-by-side, with a test article (e.g., truck) in place on a third flat-bed trailer, placed end-to-end centrally with the first two trailers.

DETAILED DESCRIPTION OF EXEMPLARY EMBODIMENTS

Figure 1:
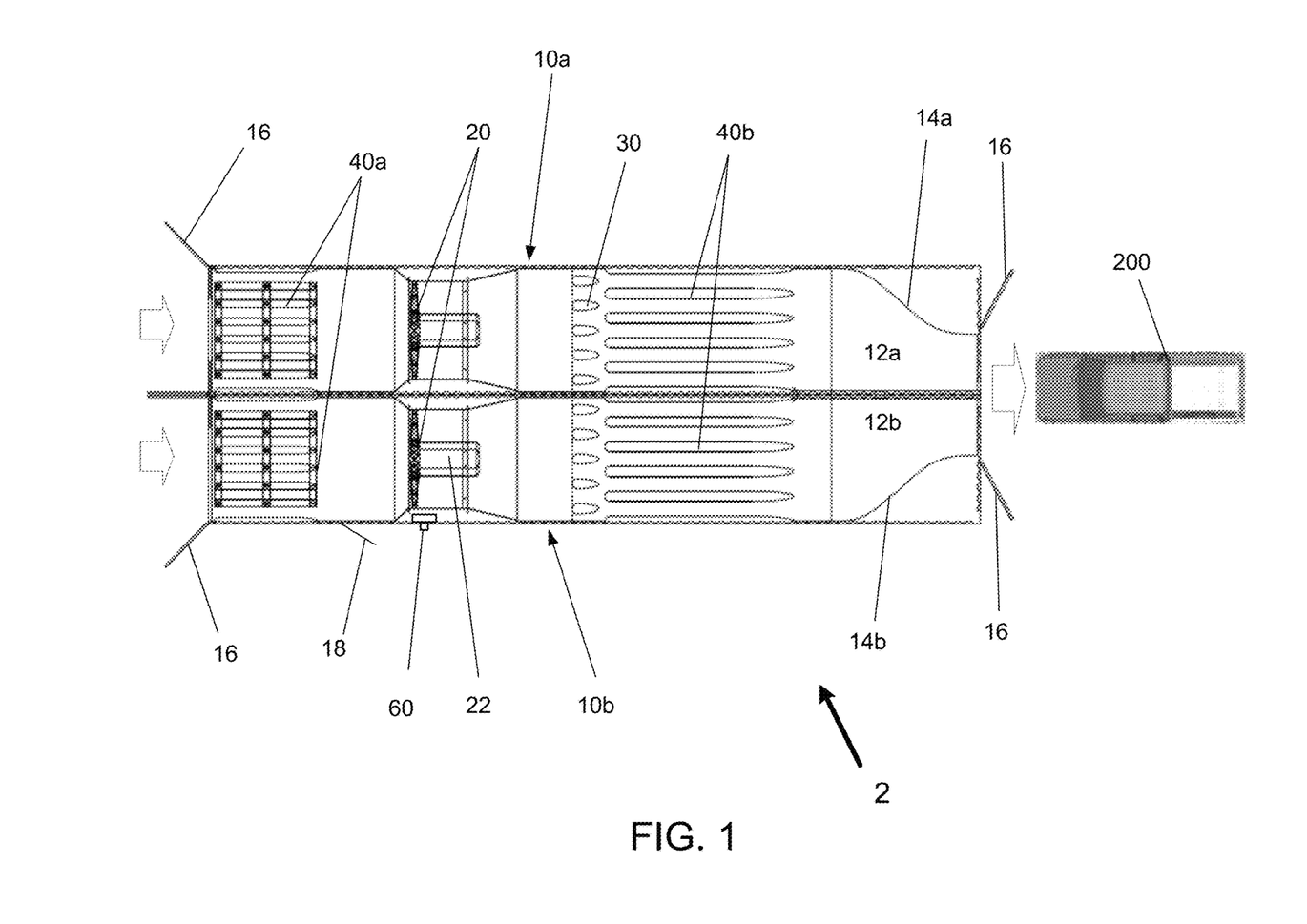
FIG. 1 shows a top view of two adjacent wind-generating containers forming a wind-tunnel in accordance with an embodiment of the present invention.

In various exemplary embodiments, the present invention comprises a transportable wind tunnel for use in full-scale aerodynamic or aeroacoustic testing, including, but not limited to, testing of automobiles or other vehicles. The wind tunnel 2 comprises one or more wind tunnel or wind generating containers which may be connected side-by-side or end-to-end to provide a wind tunnel of desired length and power. As seen in FIG. 1, each of two exemplary wind generator containers 10a,b are placed side-to-side, with each housing several wind tunnel components, including, but not limited to, one or more variable speed axial fans 20 with fan motors 22, flow conditioning elements, such as flow conditioning or turbulence screens 30, and acoustic treatment elements, such as acoustic baffles or vane, which may be located both upstream 40a and downstream 40b of the fans. The acoustic treatment elements help reduce or cancel noise from the system, thereby allowing more accurate measurement of noise resulting from airflow over the test article.

While the figures show an exemplary embodiment with two wind generating containers positioned side-by-side, different arrangements may be used. A single wind generating container, for example, may be used for smaller articles or vehicles, such as a bicycle. Alternatively, two, three or more wind generating containers may be arranged as desired (e.g., laterally, longitudinally, or vertically stacked). Wind generating containers may be positioned adjacently but unsecured, or for additional stability, may be secured to each other in whole or in part (e.g., secured along the length of the container, or only at the outflow end) during use using bolts, plates, bars, or other similar means.

A reduction or contraction area 12a, 12b at the outflow end of each container effectively results in the combined air flow after exiting the containers. The reduction area may use smooth lateral 14a, 14b or vertical 14c redirection or constricting 10c elements, or combinations thereof. As seen in FIG. 1, the constricting elements may be complementary or mirror-images so that air flow is directed to a single combined outflow exit point. The airflow speed may thus be increased or accelerated at the outflow exit point.

Figure 7:
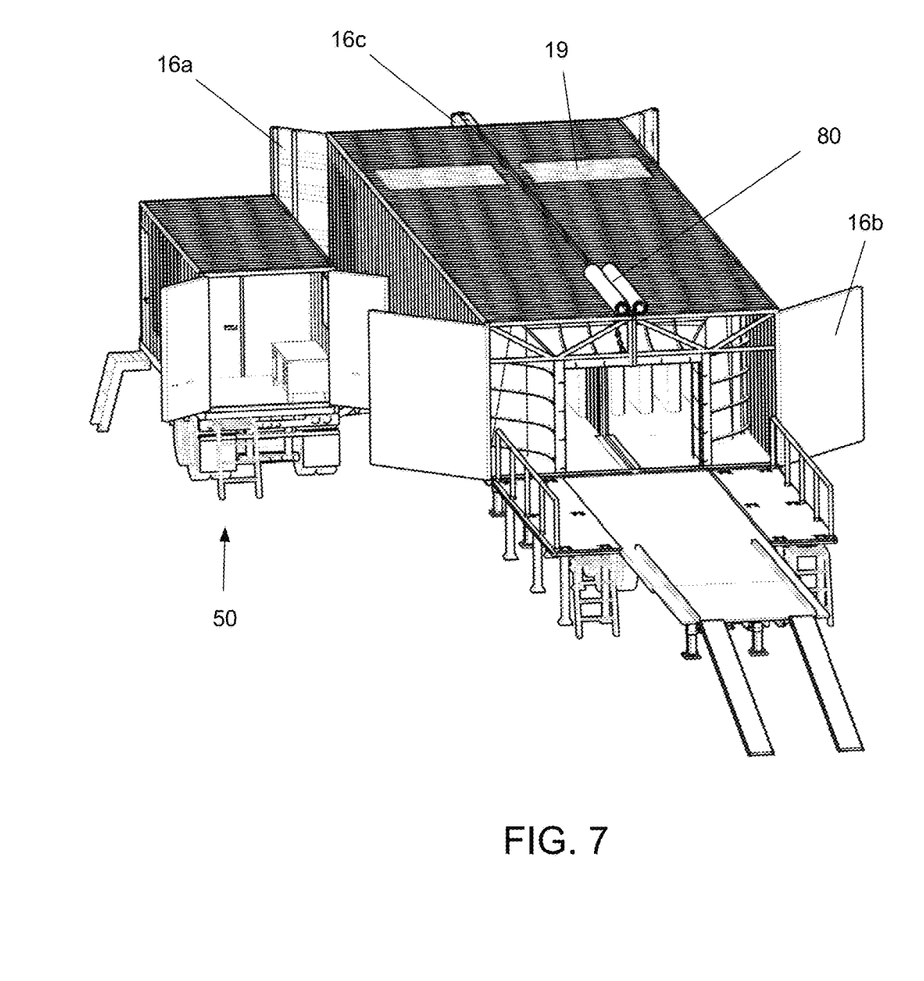
FIG. 7 shows a perspective view of the wind-tunnel of FIG. 5.
Figure 8:
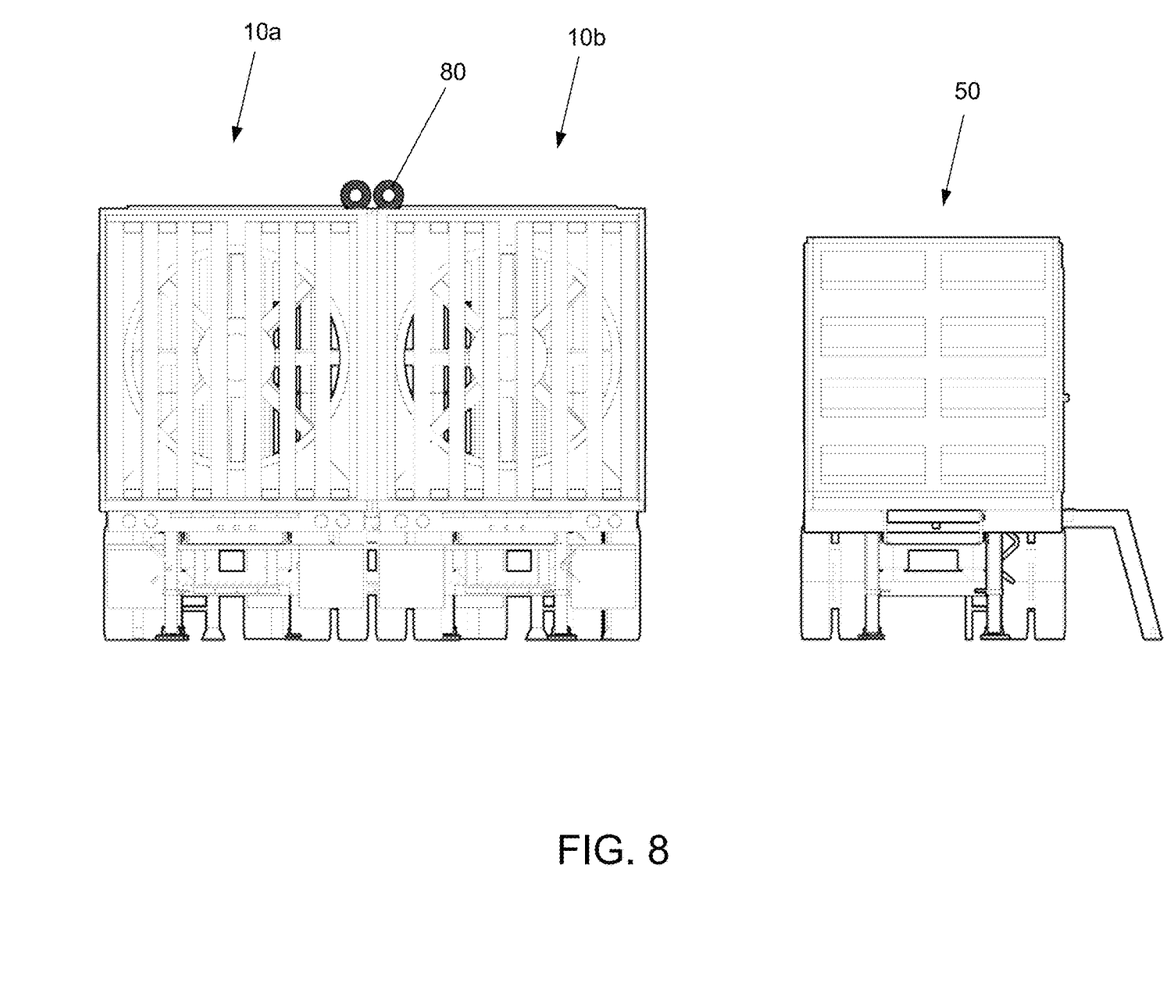
FIG. 8 shows a view from the inflow end of the wind-tunnel of FIG. 7.

In several embodiments, the side in the reduction or contraction area of each container corresponding to the direction of the outflow is removed or removable. A tarp, sliding door, removable door, cover plate, or similar covering means may be used to cover this side during transport or non-use, and is removed or opened when installed or in use. This results in a combined reduction/contraction area without an inner wall or wall to disrupt airflow to and through the outflow exit point. FIG. 7 shows an example of covering tarps 80 that have been rolled up and placed out of the way on the top of the containers during installation and use.

As seen in FIG. 1, the outflow exit point may be centrally located with respect to the containers in combination. In effect, in the two-container configuration shown, each wind generating container comprises a matching half of the reduction/contraction area for the wind tunnel.

In an alternative embodiment, reduction or contraction sections may be removably attached to the corresponding wind tunnel container. In a further embodiment, a single reduction or contraction section may be removably attached to the ends of multiple adjacent wind tunnel containers. The single reduction or contraction section may come in multiple pieces, and assembled during attachment to the wind tunnel containers.

One or more doors 16 may be located at the ends of the wind-generating containers to close the container and protect its components during transport or when not in use. The doors may be opened to allow airflow through the system during use, or access for maintenance. The doors at one end may be full-size single, standard container doors 16b, such as seen in FIG. 7 (a standard shipping container only has a door at one end). The doors at the other end, which are added for purposes of this invention, may be the same, or may comprise two half-doors 16a, as seen in FIG. 7. If the latter, the respective "inside" set of half-doors are pinned, bolted, or otherwise securely fastened together 16c, and extend outward at a substantially orthogonal angle to minimize interference with inward airflow. One or more side doors 18 or access hatches 19 also may be provided in the sides of the containers to allow access to the various sections and components. In various embodiments, the doors are sealed and airtight when closed.

One or more separate control containers 50 house electrical equipment and control systems and rooms (e.g., operator console) for support and operation of the wind tunnel.

Figure 2:
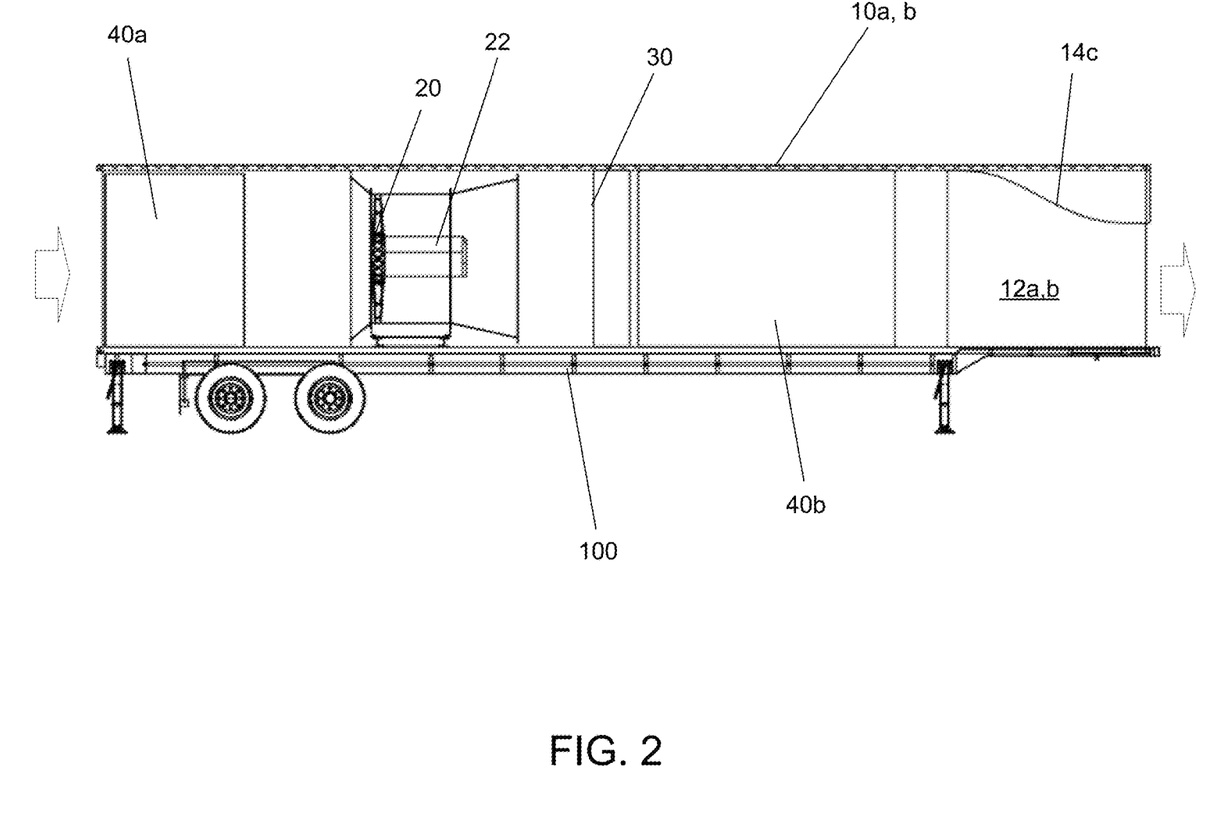
FIG. 2 shows a side view of a wind-generating container mounted on a trailer.

In several exemplary embodiments, the wind generating containers 10a,b and control containers 50 are modified shipping containers, and are separately mounted or secured on flat-bed trailers 100 for transport, as seen in FIG. 2. The containers may thus be transported to different locations. The containers may be removed from the respective trailer and placed on the ground or otherwise installed at the desired locations. The article being tested, such as, but not limited to, an automobile or truck 200, can then be placed on the ground outside the outflow exit point for testing. It should be noted that the article being tested need not be in an enclosed area, and the testing area may be in the open air.

Figure 3:
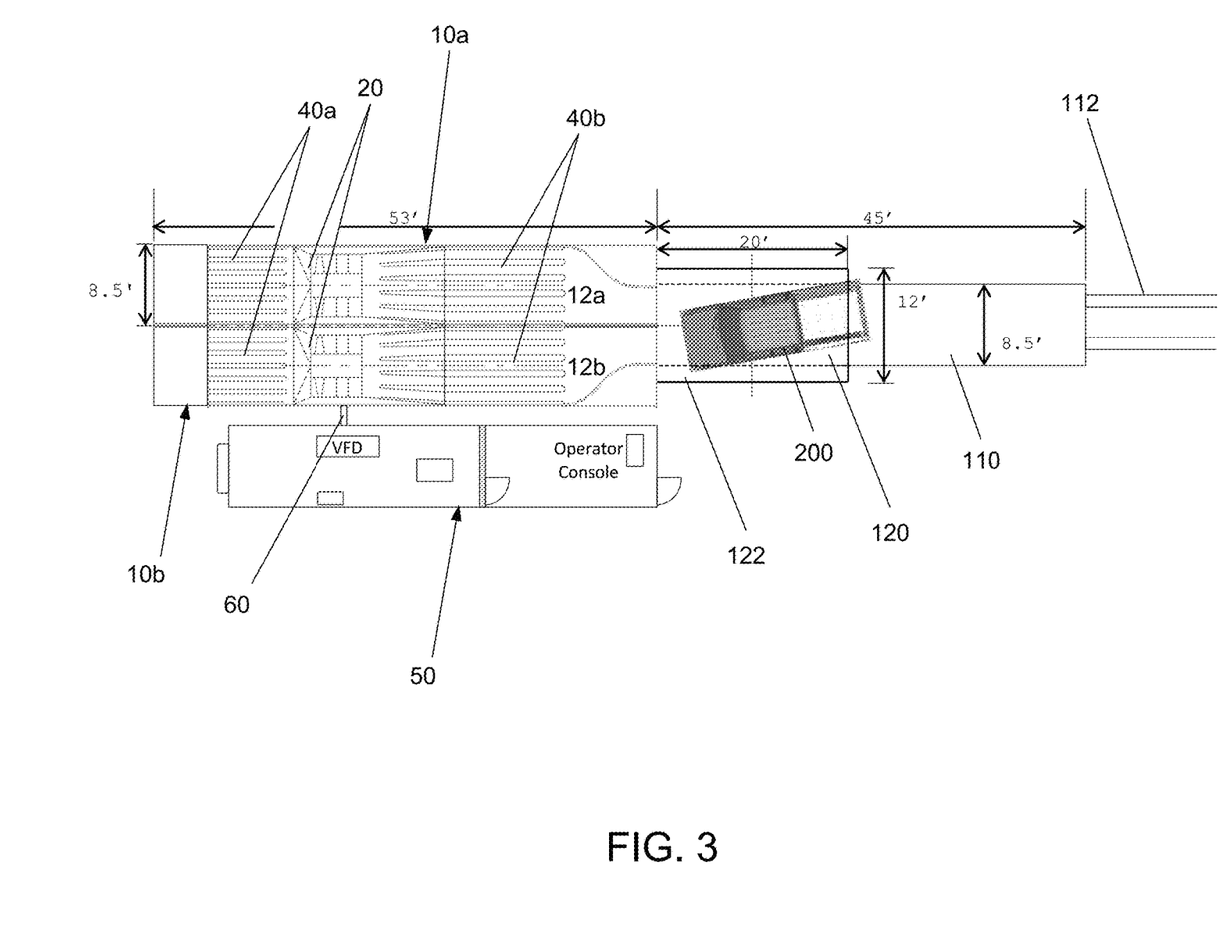
FIG. 3 shows a top view of a two-container wind-tunnel mounted on trailers configured in test mode using a truck as the example test article.
Figure 4:
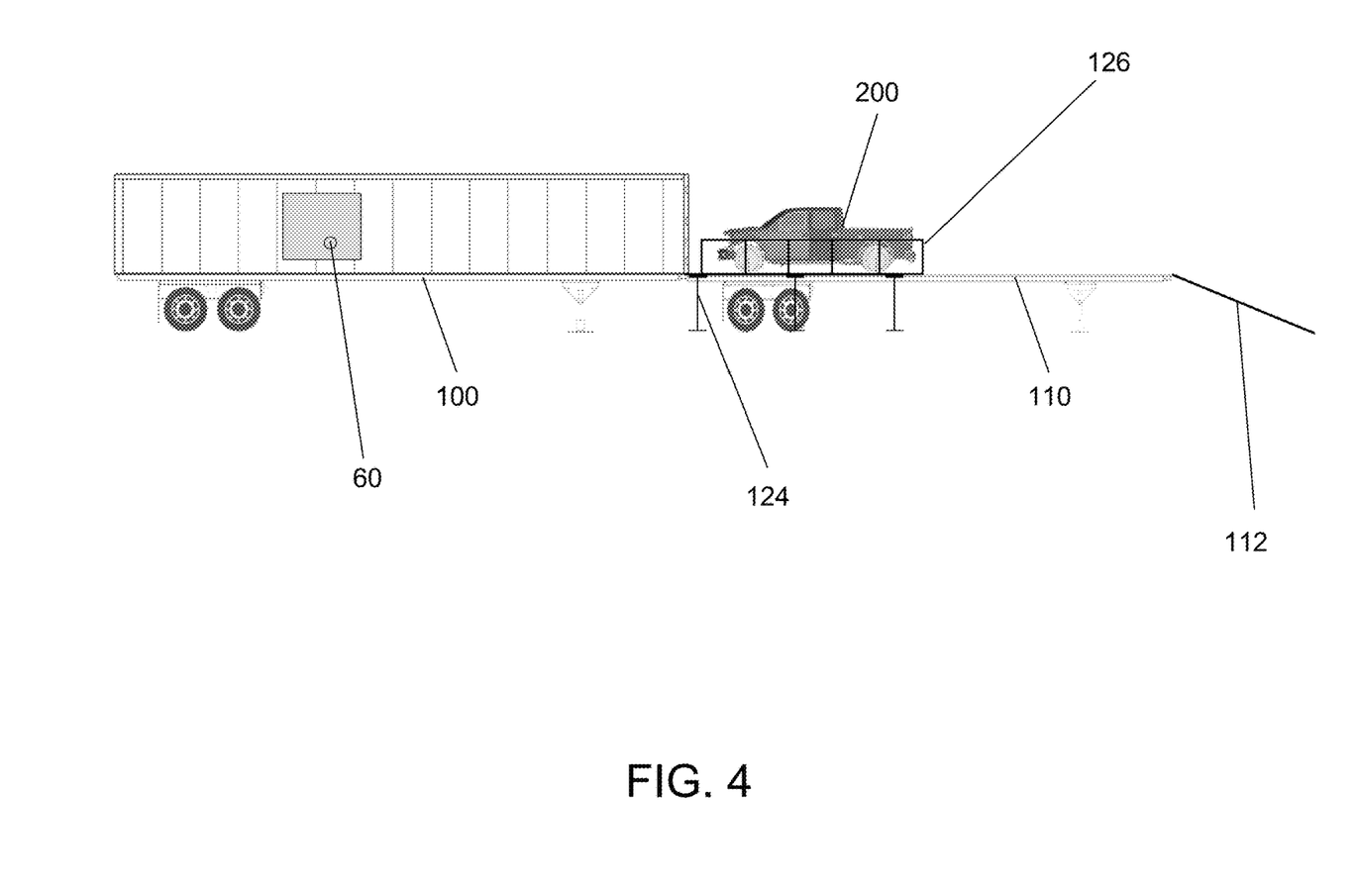
FIG. 4 shows a side view of the wind-tunnel of FIG. 3.
Figure 5:
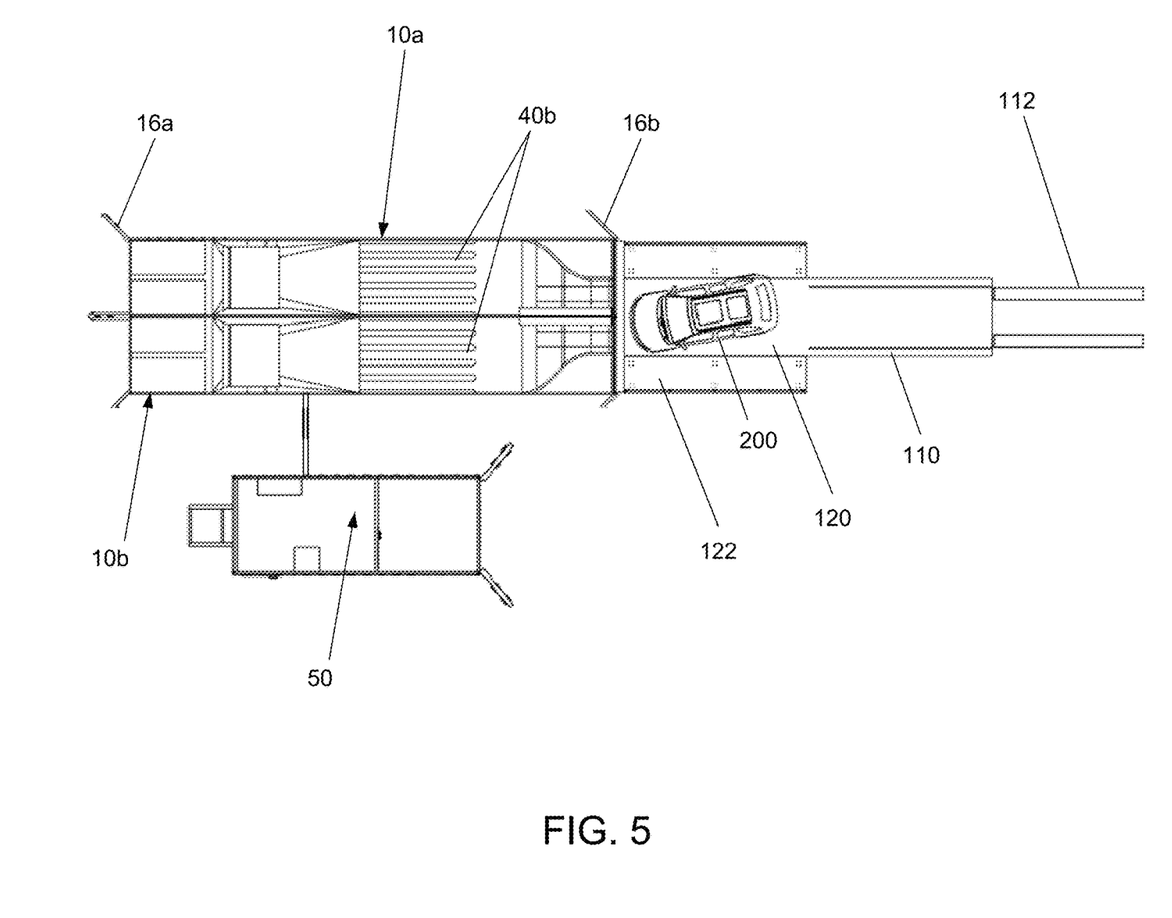
FIG. 5 shows a top view of another example of a two-container wind-tunnel mounted on trailers configured in test mode using an automobile as the example test article.
Figure 6:
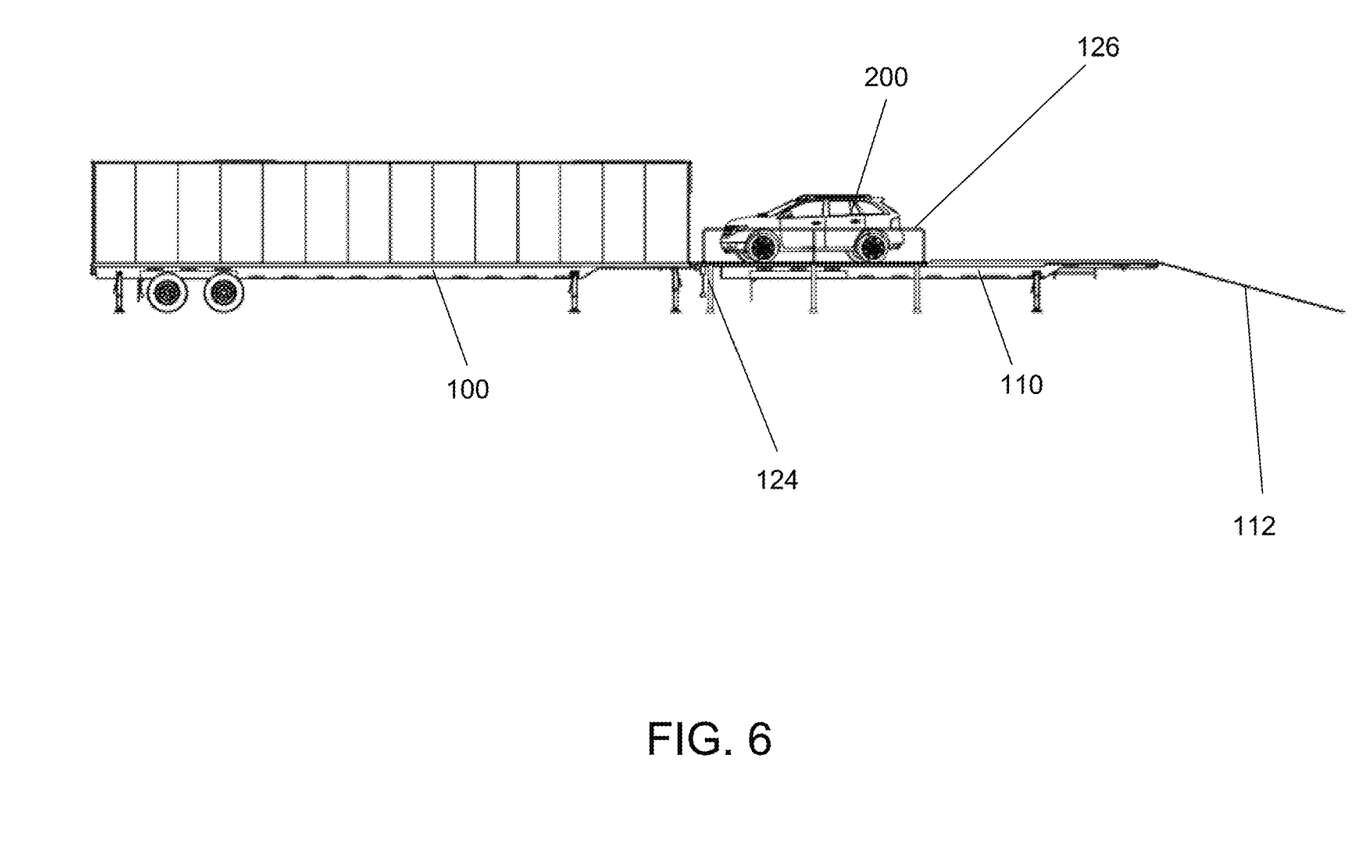
FIG. 6 shows a side view of the wind-tunnel of FIG. 5.

Alternatively, the containers may be attached to or integral with and installed on the flat-bed trailer chassis. The wind tunnel is then assembled on location by appropriate arrangement of the flat-bed trailers with the wind tunnel containers. FIG. 3 shows an example of such a configuration with two standard flat-bed trailers 100, each with a wind generating container, placed side-by-side, with a test article 200 (e.g., truck) in place on a third flat-bed trailer 110, placed end-to-end with the first two trailers. In several embodiments, the third flat-bed trailer is centrally placed relative to the center of the outflow exit point, so that the trailer overlaps part of each of the wind tunnel container trailers.

In an exemplary embodiment, a fourth trailer with the one or more control containers 50 may located alongside the first two trailers (or, particularly where the wind tunnel is placed on the ground, the control container or containers may also be placed on the ground). In the embodiment shown, the control container is electrically connected through one or more conduits or access hatches 60 along the sides of the wind generating containers, which also allow connection between adjacent wind generating containers. The access hatches also allow for maintenance access to equipment in the containers. The control container may comprise one or more variable frequency drives (VFD) for the fans, an operator console or controls, maintenance storage, and the like.

As seen in FIG. 3, the third trailer (the "test article" trailer) may comprise one or more retractable or removable ramps 112 for article (e.g., vehicle) loading and installation. At the end nearest the output air flow from the wind generating units, the test article trailer may comprise a smooth test section floor plate 120 designed to support the article or vehicle weight in a variety of positions. Fold-out extensions 122 to either side of the test section may be used to provide a minimum width testing area (e.g., 12 feet or more). The extensions may be supported by extendable beams or posts 124 to support the vehicle's weight, or may be light enough to support only a person's weight. The test section may further be provided with access stairs or ladders, and removable or folding guard rails 126.

The dimensions of the containers and trailers can vary. In one exemplary embodiment, the wind tunnel flatbed trailers are standard 53-feet long (or 40-foot long), 8.5-feet wide trailers. The test vehicle trailer and control container trailer can be the same dimensions, or smaller (e.g., 24 or 45 feet long) The outside dimensions of the wind tunnel containers are sized to fit upon the wind tunnel flatbed trailers, and can be the same dimensions as the trailers.

While the figures show two wind generating containers, the invention may include any number of shipping containers connected together, either side-by-side, end-to-end, or stacked on top of each other, in modular fashion. Each container contains its own fan or fans, and internal components to ensure smooth and quiet flow through that container. One or more reduction or contraction sections, which may be part of each container or independent of the containers (e.g., removably attached to the end of the respective container), may be used to focus and accelerate the air flow over the test vehicle (or other test article or item).

This system permits larger wind tunnels to be fashioned to ensure the quality of the airflow for any testing arrangement. For example, the test section trailer could include an embedded turn table, which turns the vehicle with relation to the air flow so as to simulate cross-winds, as well as force transducers to measure the aerodynamic forces acting on the test article.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A portable wind tunnel, comprising:
   a first trailer with a first wind tunnel container mounted thereon, said first wind tunnel container comprising at least one fan, a plurality of acoustic baffles, and an airflow reduction or contraction section;
   a second trailer with a second wind tunnel container mounted thereon, said second wind tunnel container comprising at least one fan, a plurality of acoustic baffles, and an airflow reduction or contraction section;
   wherein the respective wind tunnel container airflow reduction or contraction sections from the first wind tunnel container and the second wind tunnel container are complementary and configured to combine airflow from each respective container into a single outflow when the trailers are arranged side-by-side in parallel.

2. The portable wind tunnel of claim 1, wherein the first trailer and/or second trailer is a flat-bed truck trailer.

3. The portable wind tunnel of claim 1, further comprising one or more control containers, said one or more control containers comprising a fan drive and an operator console.

4. The portable wind tunnel of claim 3, wherein said one or more control containers are mounted on a flat-bed truck trailer, separate from the first and second wind tunnel containers.

5. The portable wind tunnel of claim 1, each wind tunnel container further comprising a flow conditioning screen.

6. The portable wind tunnel of claim 1, wherein the plurality of acoustic baffles in each wind tunnel container comprise a section of upstream acoustic baffles in relation to the at least one fan, and a section of downstream acoustic baffles in relation to the at least one fan.

7. The portable wind tunnel of claim 1, wherein the airflow reduction or contraction section in each wind tunnel container comprises one or more curved elements configured to direct and accelerate airflow.

8. The portable wind tunnel of claim 7, wherein the one or more curved elements are lateral redirection elements.

9. The portable wind tunnel of claim 7, wherein the one or more curved elements are vertical redirection elements.

10. The portable wind tunnel of claim 1, further comprising a test vehicle section adapted to receive the airflow from the outflow exit.

11. The portable wind tunnel of claim 10, wherein the test vehicle section is mounted on a flatbed truck trailer.

12. The portable wind tunnel of claim 1, wherein the airflow reduction or contraction section for each wind tunnel container is removably attached to the corresponding wind tunnel container.

13. The portable wind tunnel of claim 12, wherein a single airflow reduction or contraction section is removably attached to adjacent wind tunnel containers.

* * * * *